United States Patent
Hagiwara

(10) Patent No.: US 10,935,077 B2
(45) Date of Patent: Mar. 2, 2021

(54) HUB UNIT BEARING AND METHOD FOR MANUFACTURING SAME, AND MOTOR VEHICLE AND METHOD FOR MANUFACTURING SAME

(71) Applicant: NSK Ltd., Tokyo (JP)

(72) Inventor: Nobuyuki Hagiwara, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/614,606

(22) PCT Filed: Apr. 20, 2018

(86) PCT No.: PCT/JP2018/016269
§ 371 (c)(1),
(2) Date: Nov. 18, 2019

(87) PCT Pub. No.: WO2019/026358
PCT Pub. Date: Feb. 7, 2019

(65) Prior Publication Data
US 2020/0072281 A1    Mar. 5, 2020

(30) Foreign Application Priority Data
Jul. 31, 2017    (JP) .............................. JP2017-148406

(51) Int. Cl.
F16C 19/34    (2006.01)
F16C 33/58    (2006.01)
(Continued)

(52) U.S. Cl.
CPC ............ F16C 33/586 (2013.01); F16C 43/08 (2013.01); B60B 27/001 (2013.01); B60B 27/0005 (2013.01)

(58) Field of Classification Search
CPC .... F16C 19/186; F16C 19/386; F16C 33/586; F16C 43/04; F16C 2226/52; F16C 2326/02; B60B 27/001; B60B 27/0005
See application file for complete search history.

(56) References Cited

U.S. PATENT DOCUMENTS 5,226,738 A    7/1993  Valette et al.
5,822,860 A    10/1998 Wadsworth-Dubbert et al.
(Continued)

FOREIGN PATENT DOCUMENTS

CN    202023836 U    11/2011
CN    205689594 U    11/2016
(Continued)

OTHER PUBLICATIONS

Japanese Notice of Reasons for Rejection issued in JP 2018-538911 dated Feb. 12, 2019.
(Continued)

Primary Examiner — Phillip A Johnson
(74) Attorney, Agent, or Firm — Sughrue Mion, PLLC

(57) ABSTRACT

An inner ring (10a) of a hub is fitted around a fitting tube part (11) in a state where an axially outer end of the inner ring abuts on a step surface (12), and the axially inner end surface of the inner ring is pressed by an axially outer surface of a pressing part (17) of a clamp portion (13a). Thereby, a hub body (9a) and the inner ring (10a) are fixedly coupled. The clamp portion (13a) has an engaging recess (19) that extends in a radial direction. The inner ring (10a) has an engaging protrusion (21) that is engaged with the engaging recess (19).

17 Claims, 6 Drawing Sheets

(51) Int. Cl.
*F16C 43/08* (2006.01)
*B60B 27/00* (2006.01)

(56) References Cited

U.S. PATENT DOCUMENTS

| | | | |
|---|---|---|---|
| 6,497,515 B1* | 12/2002 | Sahashi | B60B 27/00 384/544 |
| 7,883,272 B2* | 2/2011 | Kiuchi | F16C 19/185 384/544 |
| 2007/0140611 A1 | 6/2007 | Chifu et al. | |
| 2008/0089628 A1 | 4/2008 | Kiuchi et al. | |

FOREIGN PATENT DOCUMENTS

| | | |
|---|---|---|
| EP | 0 927 651 A2 | 7/1999 |
| JP | 08-91187 A | 4/1996 |
| JP | 2001-001710 A | 1/2001 |
| JP | 2002-070851 A | 3/2002 |
| JP | 2003-130062 A | 5/2003 |
| JP | 2005147199 A * | 6/2005 ............ F16C 33/586 |
| JP | 2005-249047 A | 9/2005 |
| JP | 2006-105343 A | 4/2006 |
| JP | 2006-112470 A | 4/2006 |
| JP | 2006-144990 A | 6/2006 |
| JP | 2007-292142 A | 11/2007 |
| JP | 2009168236 A | 7/2009 |
| JP | 2010095063 A | 4/2010 |
| JP | 2010-144923 A | 7/2010 |
| JP | 2017048860 A | 3/2017 |

OTHER PUBLICATIONS

International Search Report of PCT/JP2018/016269 dated Jul. 3, 2018.

Communication dated Mar. 12, 2020 by the European Patent Office in application No. 18841705.9.

Communication dated Sep. 27, 2020, issued by China National Intellectual Property Administration in Application No. 201880047160.8.

* cited by examiner (A)

(B)

HUB UNIT BEARING AND METHOD FOR MANUFACTURING SAME, AND MOTOR VEHICLE AND METHOD FOR MANUFACTURING SAME

CROSS REFERENCE TO RELATED APPLICATIONS

This application is a National Stage of International Application No. PCT/JP2018/016269 filed Apr. 20, 2018, claiming priority based on Japanese Patent Application No. 2017-148406 filed Jul. 31, 2017, the contents of which are incorporated herein by reference.

TECHNICAL FIELD

The present invention relates to a hub unit bearing for supporting a wheel and a braking rotor of a motor vehicle to be rotatable relative to a suspension and a method for manufacturing the same, and a motor vehicle having the hub unit bearing and a method for manufacturing the same.

BACKGROUND ART

A wheel and a braking rotor of a motor vehicle are supported by hub unit bearings to be rotatable relative to a suspension. FIG. 7 shows a structure of a hub unit bearing 1 disclosed in U.S. Pat. No. 5,226,738. The hub unit bearing 1 rotatably supports a hub 3 on an inner diameter side of an outer ring 2 via a plurality of rolling elements 4. The outer ring 2 has a plurality of rows of outer ring raceways 5a and 5b on an inner circumferential surface thereof, and a stationary flange 6 that protrudes to support and fix the outer ring 2 to a knuckle of a suspension at an axially middle portion thereof. The hub 3 has a plurality of rows of inner ring raceways 7a and 7b on an outer circumferential surface thereof, and a rotatable flange 8 at an axially outer portion thereof which axially protrudes outside an axially outer end face of the outer ring 2. The rolling elements 4 are disposed between the plurality of rows of outer ring raceways 5a and 5b and the plurality of rows of inner ring raceways 7a and 7b such that a plurality of rolling elements 4 are rollable for each of the rows. With this structure, the hub 3 is rotatably supported on the inner diameter side of the outer ring 2.

In the example of FIG. 7, balls are adopted as the rolling elements 4, but tapered rollers can also be used. Further, "outside" in the axial direction is a left side of FIG. 7 which becomes the outside of the motor vehicle in a state where the hub unit bearing 1 is assembled to the motor vehicle. Conversely, a right side of FIG. 7 which becomes a middle side of the motor vehicle in the state where the hub unit bearing 1 is assembled to the motor vehicle is "inside" in the axial direction.

In the example of FIG. 7, the hub 3 is formed by combining a hub body 9 and an inner ring 10. The hub body 9 has the inner ring raceway 7a of the plurality of rows of inner ring raceways 7a and 7b which is on the outside in the axial direction on an outer circumferential surface of an axially middle portion thereof, and the rotatable flange 8 at an axially outer portion thereof. Further, the hub body 9 has a fitting tube part 11 whose outer diameter is smaller than a portion adjacent to the outside in the axial direction and which is located at an axially inner portion thereof which is axially located inside the inner ring raceway 7a on the outside in the axial direction.

The inner ring 10 has the inner ring raceway 7b of the plurality of rows of inner ring raceways 7a and 7b which is on the inside in the axial direction on an outer circumferential surface thereof. This inner ring 10 is fitted around the fitting tube part 11 in a state where an axially outer end face thereof abuts on a step surface 12 that is at an axially outer end of an outer circumferential surface of the fitting tube part 11. In this state, an axially inner end face of the inner ring 10 is pressed by a clamp portion 13 formed by plastically deforming a cylindrical part, which extends from an axially inner end of the fitting tube part 11 in the axial direction, outward in a radial direction. With this structure, separation of the inner ring 10 from the hub body 9 is prevented.

In this structure disclosed in U.S. Pat. No. 5,226,738, when a force with which the clamp portion 13 presses the axially inner end face of the inner ring 10 is not sufficient, there is a possibility of relative slipping (creep) occurring between the hub body 9 and the inner ring 10.

Technology for preventing occurrence of creep between a hub body and an inner ring by increasing surface roughness of a chamfered portion that connects an outer circumferential surface and an axially inner end face of the inner ring is disclosed in European Patent Application, Publication No. 0927651. Further, a structure in which a chamfering dimension of a chamfered portion that connects an outer circumferential surface and an axially inner end face of an inner ring is changed in a circumferential direction is disclosed in U.S. Pat. No. 5,822,860.

Further, a structure in which a projection is provided at a clamp portion, a depression is provided on an inner ring, and the projection and the depression are engaged is disclosed in Japanese Patent Application, Publication Nos. 2002-70851 and F108-91187.

CITATION LIST

Patent Literature

[Patent Document 1]
  U.S. Pat. No. 5,226,738
[Patent Document 2]
  European Patent Application, Publication No. 0927651
[Patent Document 3]
  U.S. Pat. No. 5,822,860
[Patent Document 4]
  Japanese Patent Application, Publication No. 2002-70851
[Patent Document 5]
  Japanese Patent Application, Publication No. H08-91187

SUMMARY OF INVENTION

Technical Problem

However, in the structure disclosed in European Patent Application, Publication No. 0927651, in a case where a force with which a clamp portion presses the axially inner end face of the inner ring is not sufficient, there is a possibility of creep occurring between the hub body and the inner ring. Especially, in a case of a structure in which there is a gap between the chamfered portion of the inner ring and the clamp portion, an effect of preventing creep by increasing the surface roughness of the chamfered portion cannot be obtained.

In the structure disclosed in U.S. Pat. No. 5,822,860, a force with which a clamp portion presses the axially inner end face of the inner ring is made uneven in the circumferential direction, and the inner ring is unevenly distorted in the circumferential direction, so that out-of-roundness of an inner ring raceway may be reduced. As a result, performance of the hub unit bearing may be deteriorated.

An object of the present invention is to realize a structure of a hub unit bearing capable of effectively preventing creep from occurring between a hub body and an inner ring.

Solution to Problem

An aspect in a hub unit bearing of the present invention includes: an outer ring having a plurality of rows of outer ring raceways on an inner circumferential surface thereof; a hub having a plurality of rows of inner ring raceways on an outer circumferential surface thereof; and rolling elements disposed between the plurality of rows of outer ring raceways and the plurality of rows of inner ring raceways such that a plurality of rolling elements are rollable for each of the rows. The hub includes an inner ring and a hub body. The inner ring has one of the plurality of rows of inner ring raceways which is on the inside in an axial direction on an outer circumferential surface thereof. The huh body has one of the plurality of rows of inner ring raceways which is on the outside in the axial direction and is provided on an outer circumferential surface of an axially middle portion thereof directly or via another member, a fitting tube part which is axially located inside the inner ring raceway on the outside in the axial direction and around which the inner ring is fitted, and a clamp portion that is radially bent outward from an axially inner end of the fitting tube part and presses an axially inner end face of the inner ring. The clamp portion has an engaging recess in at least one place in a circumferential direction. The inner ring has an engaging projection engaged with the engaging recess in at least one place in the circumferential direction.

The inner ring may be configured to have the engaging projection at a chamfered portion that connects the inner circumferential surface and the axially inner end face of the inner ring, in this case, the chamfered portion may serve as a convex curve whose sectional shape is a partial circular arc shape, and a radius of curvature of a sectional shape of the engaging projection may be smaller than that of a portion of the chamfered portion which is displaced from the engaging projection in the circumferential direction. Further, the chamfered portion may serve as a forged surface. Further, the clamp portion may be made up of an annular pressing part, an axially outer surface of which is in contact with the axially inner end face of the inner ring, and a curved part that connects a radially inner end of the pressing part and an axially inner end of the fitting tube part and has a section in a partial circular arc shape. A gap may be provided between an outer circumferential surface of the curved part and a portion of the chamfered portion which is displaced from the engaging projection in the circumferential direction.

An inner surface of the engaging recess may serve as a forged surface.

A width value of the engaging recess in the circumferential direction may increase toward the outside in a radial direction, and a width value of the engaging projection in the circumferential direction may increase toward the outside in the radial direction.

Another aspect in the hub unit bearing of the present invention includes: an outer ring having an outer ring raceway; a hub having an inner ring raceway; and a plurality of rolling elements disposed between the outer ring raceway and the inner ring raceway. The hub has a hub body with an outer circumferential surface, and an inner ring that is disposed on the ouster circumferential surface of the hub body and is held on the hub body. The hub body has a clamp portion for the inner ring, and a recess provided on the clamp portion. The inner ring has a land that faces the clamp portion, and a projection that is provided on the land and is engaged with the recess.

An aspect of a method for manufacturing a hub unit bearing of the present invention has a structure in which, to manufacture the hub unit bearing of the present invention as described above, a cylindrical part, which axially extends inward from the axially inner end of the fitting tube part in a state where the inner ring is fitted around the fitting tube part and having an axial recess extending in the axial direction in at least one place in the circumferential direction, is plastically deformed outward in the radial direction, and thereby the clamp portion is formed.

An aspect of a motor vehicle of the present invention includes the hub unit bearing of the present invention as described above.

An aspect of a method for manufacturing a motor vehicle of the present invention has a structure in which a hub unit bearing is manufactured by the method for manufacturing a hub unit bearing of the present invention as described above.

Advantageous Effects of Invention

According to the aspect of the hub unit bearing of the present invention as described above, it is possible to effectively prevent creep from occurring between the hub body and the inner ring.

Figure 3:
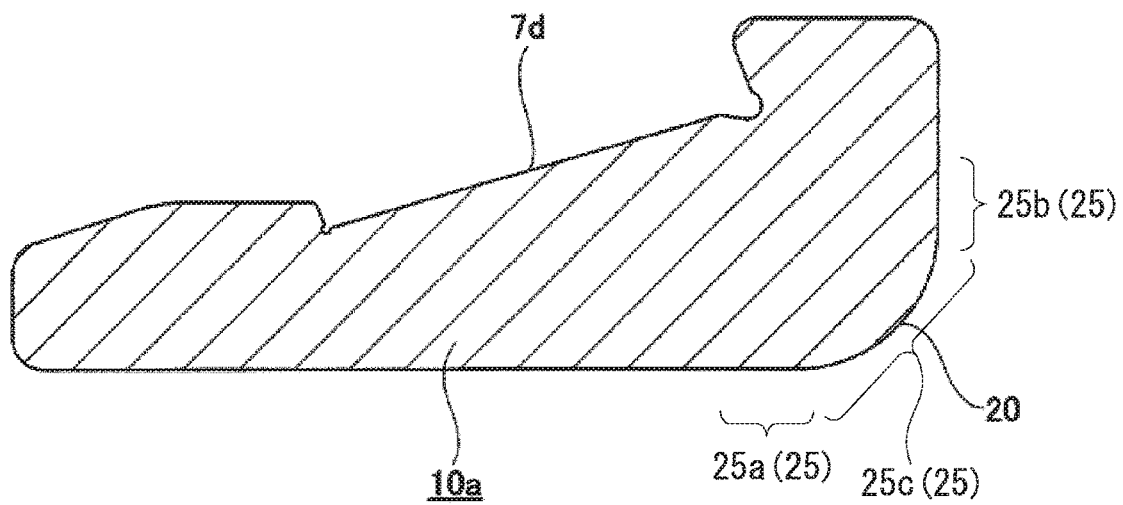
Figure 3:
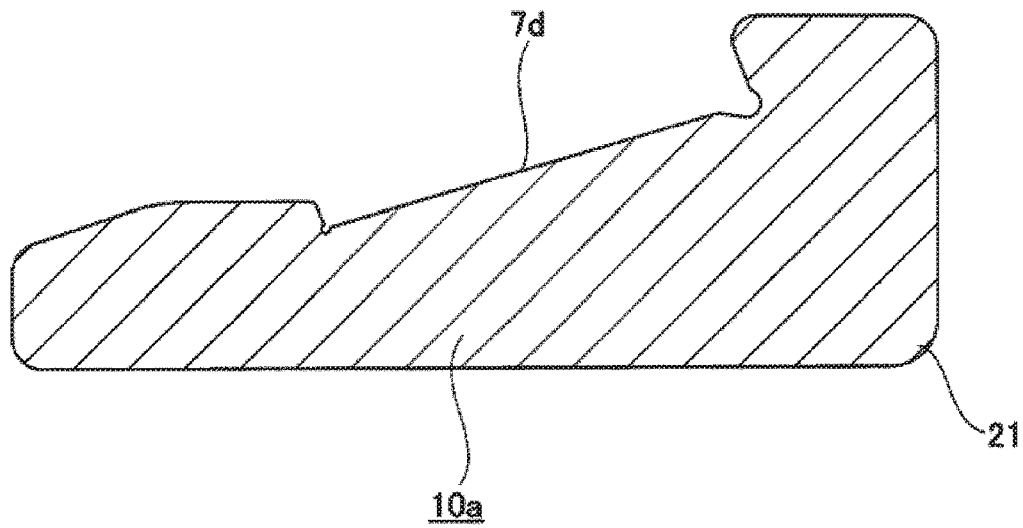

Part (A) of FIG. 3 is a sectional view of a portion of an inner ring which is displaced from a portion at which an engaging projection is provided in a circumferential direction, and part (B) of FIG. 3 is a sectional view of a portion of the inner ring at which the engaging projection is provided.

Figure 4:
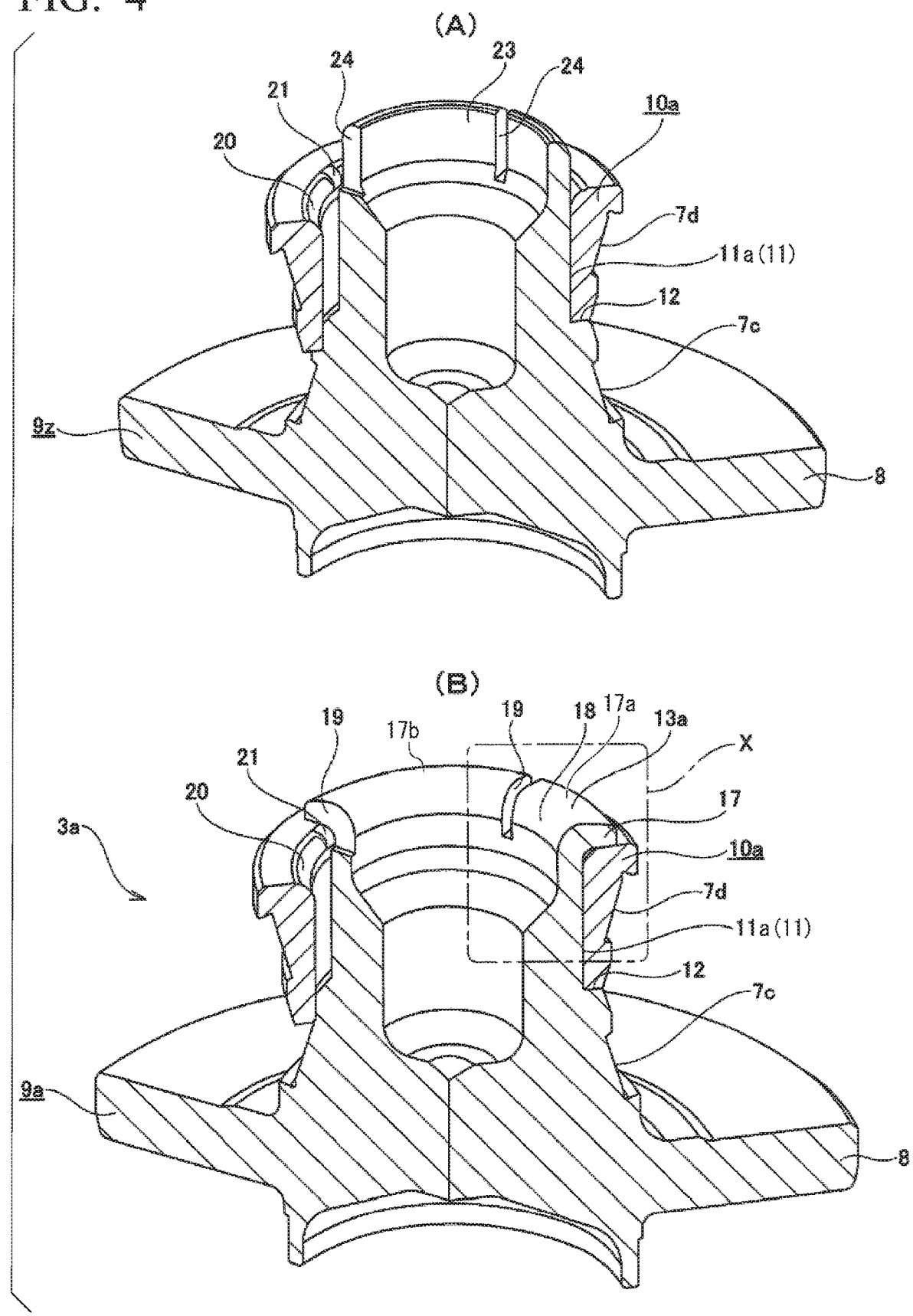

FIG. 4 is a sectional perspective view showing a hub body and the inner ring, wherein part (A) of FIG. 4 shows a state before a clamp portion is formed, and part (B) of FIG. 4 shows a state after the clamp portion is formed.

Figure 5:
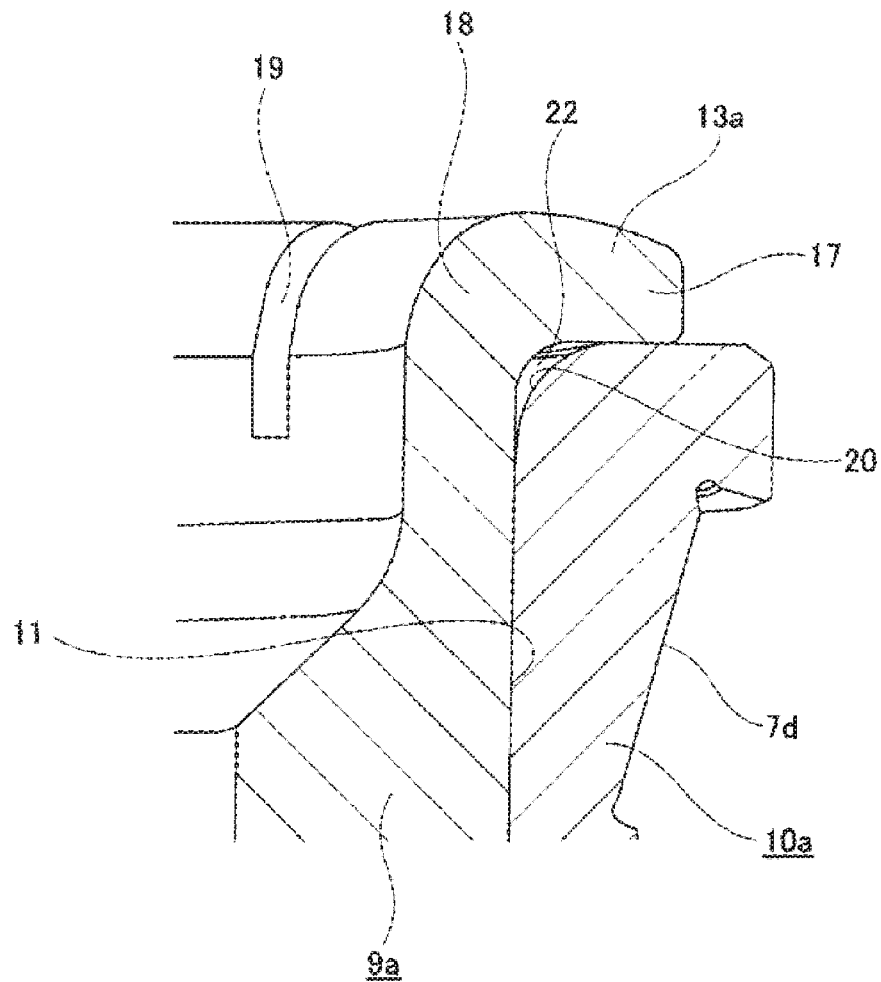

FIG. 5 is an enlarged view of a portion X of par (B) of FIG. 4.

Figure 6:
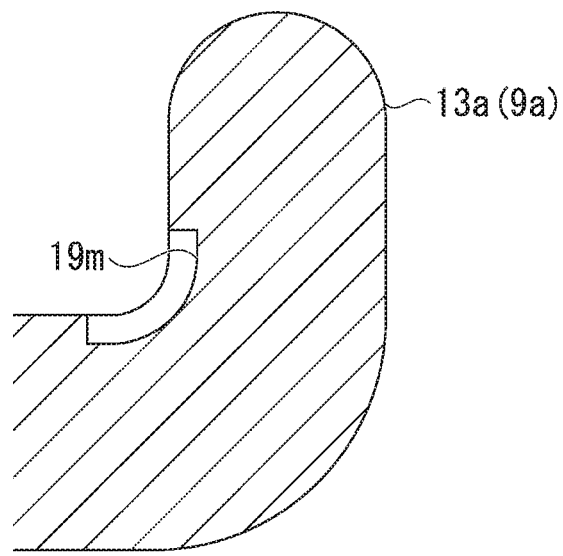

FIG. 6 is a partial sectional view showing another example of a recess.

Figure 7:
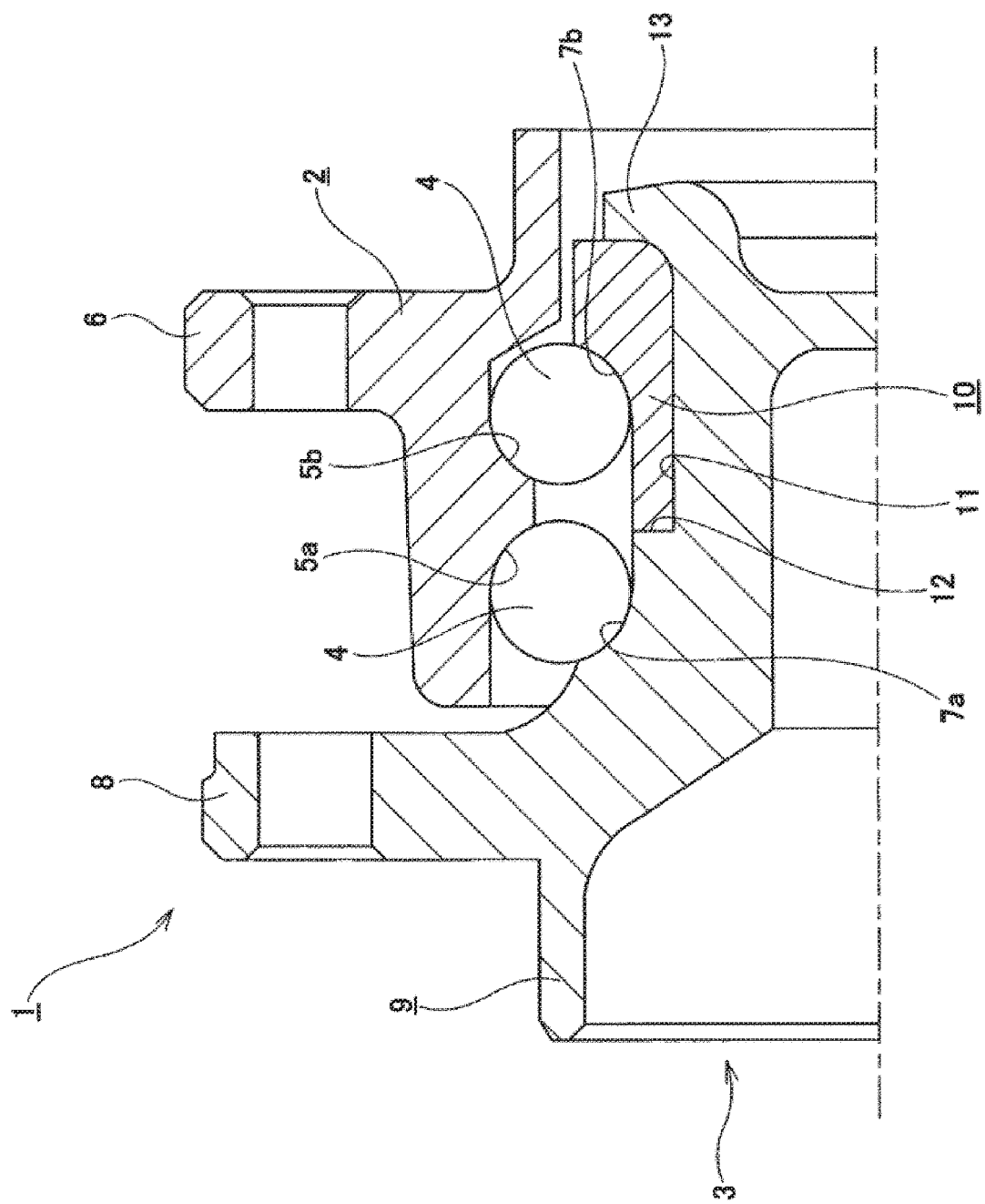

FIG. 7 is a sectional view showing an example of a conventional structure of the hub unit bearing.

DESCRIPTION OF EMBODIMENTS

FIGS. 1 to 5 show an example of an embodiment of the present invention. A hub unit bearing 1a of this example rotatably supports a hub 3a on an inner diameter side of an outer ring 2a via a plurality of rolling elements 4a and 4b. The hub unit bearing 1a includes the outer ring 2a having outer ring raceways 5c and 5d, the hub 3a having inner ring raceways 7c and 7d, and the plurality of rolling elements 4a and 4h disposed between the outer ring raceways 5c and 5d and the inner ring raceways 7c and 7d.

The outer ring 2a has the plurality of rows of outer ring raceways 5c and 5d on an inner circumferential surface thereof, and a stationary flange 6 that protrudes outward in a radial direction at an axially middle portion thereof. In an example, the outer ring 2*a* is made of a hard metal such as medium carbon steel. In another example, the outer ring 2*a* can be formed of another material. In an example, the plurality of rows of outer ring raceways 5*c* and 5*d* have partially conical concavities that are inclined in directions in which diameters thereof increase in the directions away from each other in the axial direction. The stationary flange 6 has supporting holes 14 in a plurality of places in a circumferential direction of a radial middle portion thereof. The outer ring 2*a* is supported and fixed to a knuckle of a suspension by screwing bolts, which are inserted through through-holes provided on the knuckle, into the supporting holes 14.

The hub 3*a* is disposed on the inner diameter side of the outer ring 2*a* coaxially with the outer ring 2*a*. The hub 3*a* has the plurality of rows of inner ring raceways 7*c* and 7*d* on an outer circumferential surface thereof. Further, the hub 3*a* has a rotatable flange 8 that protrudes outward in a radial direction at an axially outer portion thereof which protrudes outside an axially outer end face of the outer ring 2*a* in an axial direction. In an example, the plurality of rows of inner ring raceways 7*c* and 7*d* have partially conical convexities that are inclined in directions in which diameters thereof increase in the directions away from each other in the axial direction. The rotatable flange 8 has mounting holes 15 in a plurality of places in a circumferential direction of a radial middle portion thereof. In a service condition, base ends of studs are press-fitted and fixed to the mounting holes 15, and a Wheel constituting a braking rotor such as a disc rotor or a drum brake and a wheel is supported and fixed to the rotatable flange 8 of the hub 3*a* by the studs.

Figure 1:
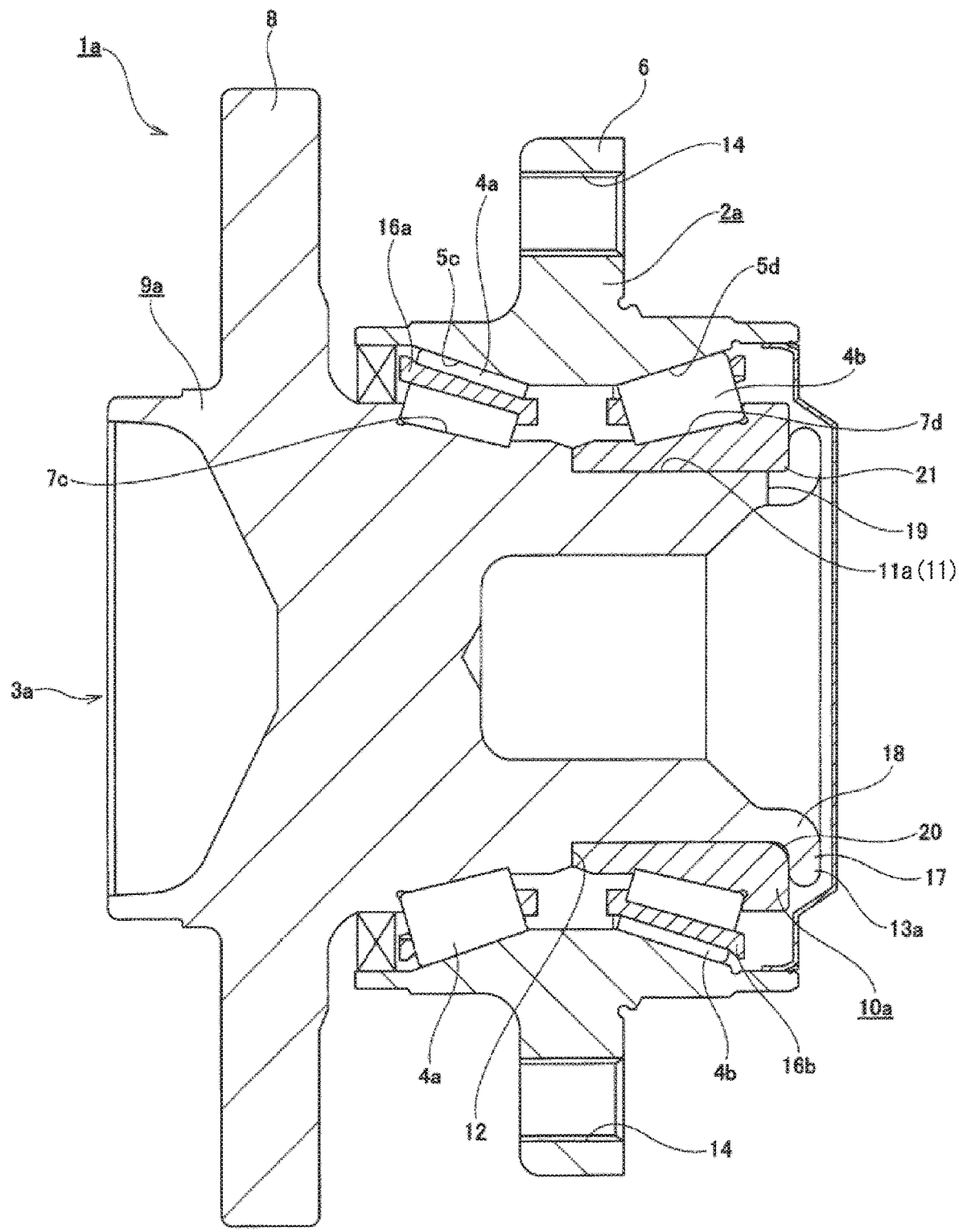
FIG. 1 is a sectional view showing a hub unit bearing of an example of an embodiment of the present invention.
Figure 2:
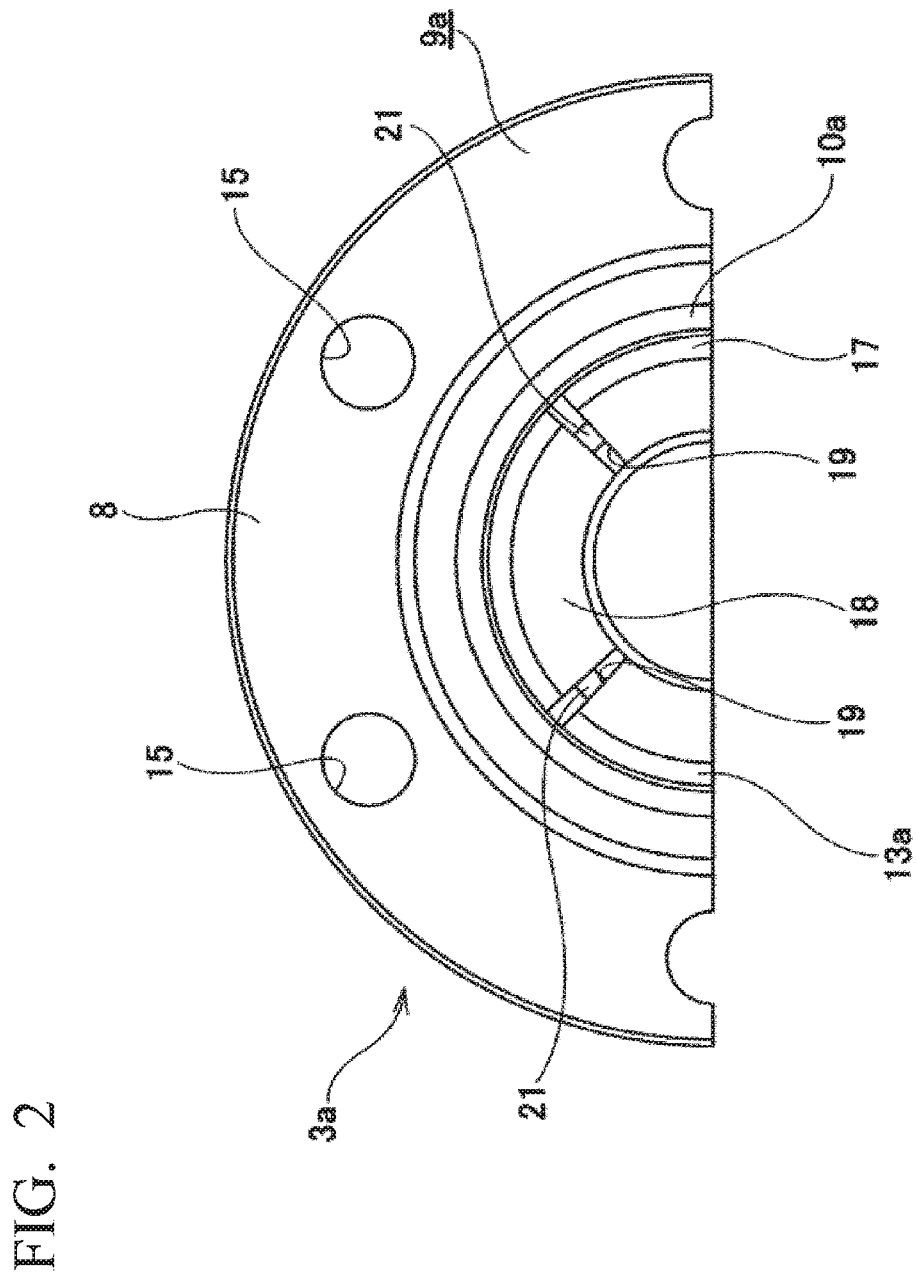
FIG. 2 is a partial sectional view showing a state where a hub is viewed from a right side of FIG. 1.

"Outside" in the axial direction is left sides of FIGS. 1 and 3 and a lower side of FIG. 4, both of which become the outside of a motor vehicle in a state where the hub unit bearing 1*a* is assembled to the motor vehicle. Conversely, right sides of FIGS. 1 and 3 and an upper side of FIG. 4, both of which become a middle side of the motor vehicle in the state where the hub unit bearing 1*a* is assembled to the motor vehicle is "inside" in the axial direction. Further, FIGS. 1 and 4 are shown without the mounting holes 15.

The rolling elements 4*a* and 4*b* are disposed between the plurality of rows of outer ring raceways 5*c* and 5*d* and the plurality of rows of inner ring raceways 7*c* and 7*d* such that the plurality of rolling elements 4*a* and 4*b* are rollable in a state where they are retained by retainers 16*a* and 16*b*. In an example, the rolling elements 4*a* and 4*b* are made of a hard metal such as bearing steel or ceramic. In another example, the rolling elements 4*a* and 4*b* can be formed of another material. With this structure, the hub 3*a* is rotatably supported on the inner diameter side of the outer ring 2*a*. In the example of FIG. 1, tapered rollers, each of which has an outer diameter gradually increasing from one end thereof to the other end thereof in an axial direction, are used as the rolling elements 4*a* and 4*b*.

The hub 3*a* is practically formed by combining a hub body 9*a* and an inner ring 10*a*. The hub 3*a* has the hub body 9*a* having an outer circumferential surface 11*a*, and the inner ring 10*a* that is disposed on the outer circumferential surface 11*a* of the hub body 9*a* and is held on the hub body 9*a*. The hub body 9*a* has the inner ring raceway 7*c* of the plurality of rows of inner ring raceways 7*c* and 7*d* which is on the outside in the axial direction on an outer circumferential surface of an axially middle portion thereof, and the rotatable flange 8 at an axially outer portion thereof which is axially located outside the inner ring raceway 7*c* on the outside in the axial direction. In an example, the hub body 9*a* is made of a hard metal such as medium carbon steel. In another example, the hub body 9*a* can be formed of another material. Further, the hub body 9*a* has a fitting tube part 11 (a tube part 11) whose outer diameter is smaller than a portion adjacent to the outside in the axial direction and which is located at an axially inner portion thereof which is axially located inside the inner ring raceway 7*c* on the outside in the axial direction. Therefore, a step surface 12 directed inward in the axial direction exists at an axially outer end of an outer circumferential surface 11*a* of the fitting tube part 11. Furthermore, the hub body 9*a* has a clamp portion 13*a* that is radially bent outward from an axially inner end of the fitting tube part 11 and has an approximately L-shaped section. In other words, the hub body 9*a* has the clamp portion 13*a* for the inner ring 10*a* (the clamp portion 13*a* for holding the inner ring 10*a*). The tube part 11 of the hub body 9*a* has a circumferential wall whose thickness is at least partly changed in the axial direction. In the circumferential wall of the tube pail 11, one axial end (a first axial end) of the inner ring 10*a* is disposed at a first portion (a thick part) having a relatively great wall thickness, and the other axial end (a second axial end) of the inner ring 10*a* is disposed at a second portion (a thin part) having a relatively small wall thickness. The clamp portion 13*a* that covers the axial end (the second axial end) of the inner ring 10*a* which has a flexure extending in a circumferential direction is provided at the second portion of the circumferential wall of the hub body 9*a*.

The clamp portion 13*a* has a pressing part (a clamp flange or an annular edge) 17 that extends in a radial direction and a circumferential direction and has an overall annular shape, a curved part (a flexure part or a connecting part) 18 that connects a radially inner end of the pressing part 17 and the axially inner end of the fitting tube part 11 and has a section in a partial circular arc shape, and recesses (recessed grooves, engaging slits, engaging recesses, recesses, or engaging recesses) 19. For example, at least some of the recesses 19 are provided between a side facing the inner ring 10*a* at the clamp portion 13*a* and a side opposite to the side in a penetrated state. In an example, each of the recesses 19 has a slit (an engaging slit or a through-slit) provided on the hub body 9*a* to be parallel to the axial and radial directions of the hub body 9*a*, or is a part of the slit. Hereinafter, for convenience, the recesses 19 are referred to as engaging slits 19. The engaging slits 19 are provided on one or more places of the clamp portion 13*a* in a circumferential direction. In each of the engaging slits 19, a portion formed at the pressing part 17 is provided to pass through the pressing part 17 in the axial direction, and a portion formed at the curved part 18 is provided to pass through the curved part 18 in the radial direction. A width value of this engaging slit 19 in the circumferential direction increases toward the outside in the radial direction. That is, in each of the slits 19, a circumferential length (a circumferential width or a slit width) at a radially outward position is longer than a circumferential length (a circumferential width or a slit width) at a radially inward position. In another example, in each of the slits 19, the circumferential length (the circumferential width or the slit width) at the radially outward position is substantially the same as the circumferential length (the circumferential width or the slit width) at the radially inward position. In an example, inner surfaces of the engaging slits 19 serve as forged surfaces. That is, the engaging slits 19 are designed to be formed when forging is performed on a metal material to form a rough shape of the hub body 9*a*. In another example, the engaging slits can be formed by cutting after the rough shape of the hub body is formed.

The inner ring 10a has the inner ring raceway 7d of the plurality of rows of inner ring raceways 7c and 7d which is inside in the axial direction on the outer circumferential surface thereof. As shown in FIGS. 3 and 4, the inner ring 10a has a land 25 that faces the clamp portion 13a of the hub body 9a, and projections (engaging raised portions or protrusions) 21 that are provided on the land d are engaged with the recesses (engaging slits) 19. The land 25 includes a first region 25a that faces the clamp portion 13a in the radial direction of the hub body 9a, a second region 25b that faces the clamp portion 13a in the axial direction of the hub body 9a, and a transition region 25c between the first region 25a and the second region 256b. At least a part of each projection 21 is provided on the transition region 25c. In an example, each projection 21 has a shape in which a height thereof from the land 25 varies. Further, each projection 21 has a maximum protrusion height in the transition region 25c. In other words, the inner ring 10a has a chamfered portion (a chamfered surface) 20 between an inner circumferential surface (the first region 25a) and an axially inner end face (the second region 25b). At least a part of each projection 21 is provided at the chamfered portion 20. The chamfered portion 2C) includes the transition region 25c in the land 25. In an example, the chamfered portion 20 has a convex curve whose sectional shape is a partial circular arc shape. The chamfered portion 2C) has the engaging projections 21, each of which protrudes to be higher than each adjacent portions in a circumferential direction, in one or more places in the circumferential direction. The radius of curvature of a sectional shape of each engaging projection 21 is smaller than that of a portion of the chamfered portion 20 which is displaced from each engaging projection 21 in the circumferential direction. To be specific, for example, the radius of curvature of the sectional shape of each engaging projection 21 may be set to 1 mm or more and 2 mm or less, and the radius of curvature of the sectional shape of the portion of the chamfered portion 20 which is displaced from each engaging projection 21 in the circumferential direction may be set to 3 mm or more and 5 mm or less. These numerical values are an example, and other numerical values can be applied. A width value of each engaging projection 21 in the circumferential direction can be formed to increase toward the outside in the radial direction. In another example, the chamfered portion 20 may have an oblique surface. As shown in FIG. 4, in a case where the slits 19 acting as the recesses 19 are provided on the clamp portion 13a, the clamp flange 17 of the clamp portion 13a has a plurality of segments that are at least partly separated from each other in the circumferential direction (wherein a first segment 17a and a second segment 17b are representatively shown in FIG. 4), and the projection 21 is located in a gap between the two segments (a gap between the first segment 17a and the second segment 17b) (in the slit 19) in the circumferential direction of the hub body 9a. For example, an entire shape of each of the plurality of segments (the first segment 17a and the second segment 17b) is a substantially rectangular shape or a substantial sector shape when viewed in the axial direction. In an example of each segment (17a, 17b) having a substantially rectangular shape, a circumferential length thereof at a radially outward position is substantially equal to or slightly longer than that at a radially inward position. In an example of each segment (17a, 17b) having a substantial sector shape, a circumferential length thereof at a radially outward position is substantially equal to or slightly longer than that at a radially inward position.

In an example, the chamfered portion 20 is formed by going through a forging process. That is, the chamfered portion 20 can be formed as a forged surface on which a finishing process such as a polishing process is not performed. When the inner ring 10a is formed, a rough shape of the inner ring 10a is molded by performing a forging process on a metal material. However, the chamfered portion 20 is designed to become a shape of a completed state at the time in point of a forging process. Afterward, a finishing process such as a polishing process is performed on a portion that will become the inner ring raceway 7d of the inside in the axial direction, and the inner ring 10a can be obtained.

The inner ring 10a is fitted around the fitting tube part 11 in the state where the axially outer end thereof abuts on the step surface 12. The axially inner end face of the inner ring 10a is pressed by an axially outer surface of the pressing part 17 of the clamp portion 13a. In other words, the inner ring 10a is fitted around the fitting tube part 11, and is sandwiched between the step surface 12 and the pressing part 17 of the clamp portion 13a in the axial direction. With this structure, the hub body 9a and the inner ring 10a are fixedly coupled. In an example, a gap 22 having an approximately crescent section exists between an outer circumferential surface of the curved part 18 of the clamp portion 13a and an inner circumferential surface of the portion of the chamfered portion 20 which is displaced from the engaging projections in the circumferential direction.

In an example, in the state where the hub body 9a and the inner ring 10a are fixedly coupled, the engaging slits 19 of the clamp portion 13a and the engaging projections 21 of the chamfered portion 20 are engaged. In other words, the engaging projections 21 are located inside the engaging slits 19 (the engaging projections 21 are inserted into the engaging slits 19), and the opposite sides of each engaging projection 21 in the circumferential direction are in contact with or are opposite and adjacent to inner sides of the engaging slits 19.

In an example, the hub unit bearing 1a is formed in the following way. First, a forging process and/or a cutting process are performed on a metal material, and a finishing process such as a polishing process is further performed, and thereby, a hub body 9z before the clamp portion 13a is formed as shown in (A) of FIG. 4 is formed. That is, the hub body 9z has a cylindrical part 23 that axially extends inward from the axially inner end of the fitting tube part 11. The cylindrical part 23 has axial slits 24 that extend in an axial direction in a plurality of places in a circumferential direction. In the hub body 9z, width values of the axial slits 24 in the circumferential direction are constant in the axial direction except for bottom ends of the axial slits 24. A definite magnitude of the width value of each axial slit 24 in the circumferential direction is not particularly limited as long as a force with which the inner end face of the inner ring 10a is pressed by the clamp portion 13a or a strength of the clamp portion 13a can be secured. For example, an angle formed between the opposite inner sides of each axial slit 24 in the circumferential direction can be set to 3° or more and 30° or less, and preferably 5° or more and 7° or less. These numerical values are an example, and other numerical values can be applied. An outer diameter of the cylindrical part 23 before the clamp portion 13a is formed differs depending on a size of the wheel supported by the rotatable flange 8. For example, in a case of the hub unit bearing 1a for general motor vehicles, the outer diameter of the cylindrical part 23 can be set to 25 mm to 60 mm. These numerical values are an example, and other numerical values can be applied.

After the rolling elements 4a on the outside in the axial direction are disposed around the inner ring raceway 7c on the outside in the axial direction in this hub body 9z in a state where they are held by the retainer 16a on the outside in the axial direction, the outer ring 2a is disposed around the hub body 9z. Next, the inner ring 10a, in which the rolling elements 4b of the inside in the axial direction are disposed around the inner ring raceway 7d of the inside in the axial direction in a state where they are held by the retainer 16b of the inside in the axial direction, is fitted around the fitting tube part 11 of the hub body 9z. In a state where phases of the axial slits 24 of the hub body 9z and the engaging projections 21 of the inner ring 10a are matched in the circumferential direction, the cylindrical part 23 is plastically deformed outward in the radial direction. Thus, the hub body 9a and the inner ring 10a are fixedly coupled by using the cylindrical part 23 as the clamp portion 13a, using the axial slits 24 as the engaging slits 19, and engaging the engaging slits 19 and the engaging projections 21.

With regard to a method for forming the cylindrical part 23 into the clamp portion 13a, various methods known from the past can be adopted. For example, in a state where a press having a central axis inclined with respect to a central axis of the hub body 9a is pressed against the cylindrical part 23, the clamp portion 13a can be formed by rotary clamping that causes the press to perform a whirling motion around the central axis of the hub body 9a like an orbit of a central axis caused by a precessional motion. Alternatively, the clamp portion 13a may be formed by flatly pressing clamp that presses a metal mold in an axial direction.

A process of assembling the hub unit bearing 1a can be properly changed as long as no contradictions occur. That is, for example, after the rolling elements 4a on the outside in the axial direction are disposed on an inner diameter side of the outer ring raceway 5c on the outside in the axial direction in the outer ring 2a in a state where they are held by the retainer 16a on the outside in the axial direction, the outer ring 2a and the rolling elements 4a on the outside in the axial direction can be disposed around the hub body 9z. Further, after the rolling elements 4b of the inside in the axial direction are disposed on the inner diameter side of the outer ring raceway 5d of the inside in the axial direction in the outer ring 2a in a state where they are held by the retainer 16b of the inside in the axial direction, the inner ring 10a can be inserted between the fitting tube part 11 and the rolling elements 4b of the inside in the axial direction.

In the hub unit bearing 1a of the present embodiment, since the engaging slits 19 of the hub body 9a and the engaging projections 21 of the inner ring 10a are engaged, it is possible to reliably prevent creep from occurring between the hub body 9a and the inner ring 10a. Further, in this example, since the chamfered portion 20 having the engaging projections 21 is used as the forged surface, the inner ring 10a and thus the hub unit bearing 1a can be reduced in manufacturing cost.

In the hub unit bearing 1a of the present embodiment, bearing performance can be excellently secured. That is, in a case Where the axially inner end face of the inner ring is strongly pressed by the clamp portion to prevent the creep between the hub body and the inner ring, the inner ring is elastically deformed such that the inner ring raceway of the inside in the axial direction is expanded. In contrast, in this example, since the creep between the hub body 9a and the inner ring 10a is prevented by engagement between the engaging slits 19 and the engaging projections 21, the force with which the axially inner end face of the inner ring 10a is pressed by the clamp portion 13a need not be excessively increased to prevent the creep. For this reason, the amount of elastic deformation of the inner ring 10a can be limited to be small, and the bearing performance can be excellently secured.

Further, in the present embodiment, the cylindrical part 23 having the axial slits 24 in a plurality of places in the circumferential direction is plastically deformed outward in the radial direction, and thus serves as the clamp portion 13a. For this reason, it is possible to prevent great stress from being applied to the cylindrical part 23 when the clamp portion 13a is formed in the circumferential direction, and to prevent damage such as cracks from occurring at the clamp portion 13a.

In the present embodiment, the width values of the engaging slits 19 in the circumferential direction increase toward the outside in the radial direction, and the width values of the engaging projections 21 engaged with the engaging slits 19 in the circumferential direction increase toward the outside in the radial direction. For this reason, it is possible to sufficiently secure contact areas between the inner sides of each engaging slit 19 and the opposite sides of each engaging projection 21, and to prevent damage such as deformation from occurring at the clamp portion 13a even in a case where a force attempting to relatively rotate the hub body 9a and the inner ring 10a is applied.

Further, in the present embodiment, the cylindrical part 23 is plastically deformed outward in the radial direction, so that the cylindrical part 23 is used as the clamp portion 13a, and the axial slits 24 are used as the engaging slits 19. Since the width values of the axial slits 24 in the circumferential direction are constant in the axial direction, the width values of the axial slits 24 in the circumferential direction increase toward the outside in the radial direction in a process of plastically deforming the cylindrical part 23 outward in the radial direction and forming the axial slits 24 into the engaging slits 19. Further, the width values of the engaging projections 21 engaged with the engaging slits 19 in the circumferential direction increase toward the outside in the radial direction. Therefore, even if the width values of the axial slits 24 in the circumferential direction increase toward the outside in the radial direction in association with the plastic deformation of the cylindrical part 23, the engaging slits 19 and the engaging projections 21 can be engaged without looseness in the circumferential direction in a state where the clamp portion 13a is formed.

In the hub 3a of the present structure, the recesses 19 are provided on the clamp portion 13a of the hub body 9a, the projections 21 are provided on the inner ring 10a, and the recesses 19 and the projections 21 are engaged with each other. The present structure has the following advantages compared to a structure in which the projections are provided at the clamp portion and the recesses are provided on the inner ring (a comparative structure). That is, in the comparative structure, since the thickness of the inner ring in places where the recesses are formed is thin (a locally thin place), great restrictions are imposed on processing conditions, for example, in which it is necessary for a strong force to avoid acting on the inner ring when the hub body and the inner ring are coupled. In the present structure, the inner ring 10a has no locally thin place associated with the formation of the recesses 19, and the hub body 9a and the inner ring 10a are reliably coupled. As a result, the occurrence of the creep between the hub body 9a and the inner ring 10a is effectively prevented.

In an example of the present structure, as shown in FIG. 4, the slits (the through-slits) 19 acting as the recesses can be provided on the clamp portion 13a of the hub body 9a in the hub 3a. In another example, as shown in FIG. 6, recesses (depressions) 19m can be provided on the clamp portion 13a of the hub body 9a in a non-through state. The recesses 19m and the projections (see FIG. 4) are engaged. In the structure having the recesses 19m as shown in FIG. 6, a forged surface can be relatively made smooth. On the other hand, in the structure having the recesses 19m, since engaged parts between the recesses (the depressions) 19m of the hub body 9a and the projections 21 of the inner ring 10a (see FIG. 4) are put in a hidden state, it is difficult to examine phase matching and/or an engaged state when the hub body 9a and the inner ring 10a are coupled. In the structure having the slits 19 as shown in FIG. 4, examination of phase matching and/or an engaged state between the slits (recesses) 19 and the projections 21 can be reliably performed, and the hub body 9a and the inner ring 10a are reliably coupled. Further, in the structure having the slits 19, the outer edge portions (the segments 17a and 17b) of the clamp portion 13a (the pressing part 17) are divided via the slits 19. For this reason, during forging (plastic deformation, heading, pressure molding, or bending) for forming the clamp portion 13a, circumferential tensile stress acting on the outer edge portions of the clamp portion 13a is small, and fracture and cracks of the clamp portion 13a do not occur easily. When the slits 19 are formed, chamfering is preferably performed on corners of portions adjacent to the slits 19 such that entanglement of burrs during forging for forming the clamp portion 13a does not occur. Further, to avoid stress concentration, each slit 19 preferably has a shape without a corner at a radially inward position thereof, that is, a portion between linear portions in a contour of each slit 19 preferably has no corner (a curvature is preferably disposed between the linear portions in a contour of each slit 19).

In forming the clamp portion 13a, rotary forging (rotary heading, rotary clamping) can be used. In an example of the rotary forging, a press in an oscillating state is pressed against a material, and local pressure molding is repeated. Alternatively and/or additionally, in the rotary forging, a press disposed with a central axis inclined is pressed against a material, and is moved to revolve and rotate around a central axis of the material, and local pressure molding is continuously performed and/or local pressure molding is repeated.

In the above example, tapered rollers are used as the rolling elements 4a and 4b. Alternatively and/or additionally, balls (spheres) or rolling elements having other shapes can be used as the rolling elements 4a and 4b. Further, in the above example, the inner ring raceway 7c on the outside in the axial direction is directly formed in the hub body 9a. In another example, like the inner ring raceway 7d of the inside in the axial direction, the inner ring raceway on the outside in the axial direction can be provided by externally fitting a separate inner ring. Furthermore, the present invention is not limited to a hub unit bearing for a driven wheel in which the hub body 9a is a solid body. For example, the present invention can be applied to a hub unit bearing for a driving wheel having an engaging hole such as a spline hole for engaging a driving shaft to make torque transmission possible in the center of the hub body.

REFERENCE SIGNS LIST

1a Hub unit bearing
2, 2a Outer ring
3, 3a Hub
4, 4a, 4b Rolling element
5a, 5b, 5c, 5d Outer ring raceway
6 Stationary flange
7a, 7b, 7c, 7d Inner ring raceway
8 Rotatable flange
9, 9a, 9z Hub body
10, 10a Inner ring
11 Fitting tube part
12 Step surface
13, 13a Clamp portion
14 Supporting hole
15 Mounting hole
16a, 16b Retainer
17 Pressing part (clamp flange)
18 Curved part
19, 19m Engaging slit (recess, slit)
20 Chamfered portion
21 Engaging projection (projection
22 Gap
23 Cylindrical part
24 Axial slit

The invention claimed is:
1. A hub unit bearing comprising:
an outer ring having a plurality of rows of outer ring raceways on an inner circumferential surface thereof;
a hub having a plurality of rows of inner ring raceways on an outer circumferential surface thereof; and
a plurality of rolling elements disposed between the plurality of rows of outer ring raceways and the plurality of rows of inner ring raceways such that the plurality of rolling elements are rollable for each of the rows,
wherein the hub includes an inner ring and a hub body,
the inner ring has one of the plurality of rows of inner ring raceways which is on an inside in an axial direction on an outer circumferential surface thereof,
the hub body has one of the plurality of rows of inner ring raceways which is on an outside in the axial direction and is provided on an outer circumferential surface of an axially middle portion thereof directly or via another member, a fitting tube part which is axially located inside the inner ring raceway on the outside in the axial direction and around which the inner ring is fitted, and a clamp portion that is radially bent outward from an axially inner end of the fitting tube part and presses an axially inner end face of the inner ring,
the clamp portion has an engaging recess in at least one place in a circumferential direction,
the inner ring has an engaging projection engaged with the engaging recess in at least one place in the circumferential direction,
the inner ring has the engaging projection at a chamfered portion that connects an inner circumferential surface and the axially inner end face of the inner ring, and
the chamfered portion has a convex curve whose sectional shape is a partial circular arc shape, and a radius of curvature of a sectional shape of the engaging projection is smaller than that of a portion of the chamfered portion which is displaced from the engaging projection in the circumferential direction.
2. The hub unit bearing according to claim 1, wherein the chamfered portion is a forged surface.
3. The hub unit bearing according to claim 1, wherein:
the clamp portion is made up of an annular pressing part, an axially outer surface of which is in contact with the axially inner end face of the inner ring, and
a curved part that connects a radially inner end of the pressing part and an axially inner end of the fitting tube part and has a section in a partial circular arc shape; and a gap is provided between an outer circumferential surface of the curved part and a portion of the chamfered portion which is displaced from the engaging projection in the circumferential direction.

4. The hub unit bearing according to claim 1, wherein the engaging recess is a part of a slit provided on the hub body.

5. The hub unit bearing according to claim 1, wherein an inner surface of the engaging recess is a forged surface.

6. The hub unit bearing according to claim 1, wherein a width value of the engaging recess in the circumferential direction increases toward an outside in a radial direction, and a width value of the engaging projection in the circumferential direction increases toward the outside in the radial direction.

7. A method for manufacturing the hub unit bearing according to claim 1, in which a cylindrical part, which axially extends inward from the axially inner end of the fitting tube part in a state where the inner ring is fitted around the fitting tube part and having an axial recess extending in the axial direction in at least one place in the circumferential direction, is plastically deformed outward in the radial direction, and thereby the clamp portion is formed.

8. The method for manufacturing the hub unit bearing according to claim 7, wherein rotary forging is used in the formation of the clamp portion.

9. A method for manufacturing a motor vehicle with a hub unit bearing, in which the hub unit bearing is manufactured by the method for manufacturing the hub unit bearing according to claim 7.

10. A motor vehicle comprising the hub unit bearing according to claim 1.

11. A hub unit bearing comprising:
an outer ring having an outer ring raceway;
a hub having an inner ring raceway; and
a plurality of rolling elements disposed between the outer ring raceway and the inner ring raceway,
wherein the hub has a hub body with an outer circumferential surface, and an inner ring that is disposed on the outer circumferential surface of the hub body and is held on the hub body,
the hub body has a clamp portion for the inner ring, and a recess provided on the clamp portion,
the inner ring has a land that faces the clamp portion, and a projection that is provided on the land and is engaged with the recess, and
the recess is a part of a slit provided on the hub body.

12. The hub unit bearing according to claim 11, wherein:
the land includes a first region that faces the clamp portion in a radial direction of the hub body, a second region that faces the clamp portion in an axial direction of the hub body, and a transition region between the first region and the second region; and
at least a part of the projection is provided on the transition region.

13. The hub unit bearing according to claim 11, wherein:
the land includes a first region that faces the clamp portion in a radial direction of the hub body, a second region that faces the clamp portion in an axial direction of the hub body, and a transition region between the first region and the second region; and
the projection has a maximum projection height in the transition region.

14. The hub unit bearing according to claim 11, wherein:
the clamp portion has a clamp flange that extends in the radial direction;
the clamp flange has at least in part first and second segments separated from each other in the circumferential direction; and
the projection is located in a gap between the first segment and the second segment.

15. The hub unit bearing according to claim 11, wherein the recess is provided through the clamp portion between one side facing the inner ring and an opposite side.

16. The hub unit bearing according to claim 11, wherein a circumferential width of the recess at a radially outward position is larger than or substantially equal to a circumferential width of the recess at a radially inward position.

17. A hub unit bearing comprising:
an outer ring having an outer ring raceway;
a hub having an inner ring raceway; and
a plurality of rolling elements disposed between the outer ring raceway and the inner ring raceway,
wherein the hub has a hub body with an outer circumferential surface, and an inner ring that is disposed on the outer circumferential surface of the hub body and is held on the hub body,
the hub body has a clamp portion for the inner ring, and a recess provided on the clamp portion,
the inner ring has a land that faces the clamp portion, and a projection that is provided on the land and is engaged with the recess, and
a circumferential width of the recess at a radially outward position is larger than or substantially equal to a circumferential width of the recess at a radially inward position.

* * * * *